United States Patent
Toyoda

(10) Patent No.: US 11,105,438 B2
(45) Date of Patent: Aug. 31, 2021

(54) VALVE FOR A FLUSH-MOUNTED BODY OF A SANITARY FITTING, HAVING A CONTROL KNOB ROTATABLY FASTENED TO A VALVE KNOB

(71) Applicant: Grohe AG, Hemer (DE)

(72) Inventor: Yukiko Toyoda, Hemer (DE)

(73) Assignee: Grohe AG, Hemer (DE)

( * ) Notice: Subject to any disclaimer, the term of this patent is extended or adjusted under 35 U.S.C. 154(b) by 196 days.

(21) Appl. No.: 16/512,920

(22) Filed: Jul. 16, 2019

(65) Prior Publication Data

US 2019/0338863 A1  Nov. 7, 2019

Related U.S. Application Data

(63) Continuation of application No. PCT/EP2018/050961, filed on Jan. 16, 2018.

(30) Foreign Application Priority Data

Jan. 16, 2017  (DE) .................... 10 2017 100 709.1

(51) Int. Cl.
*F16K 31/50*  (2006.01)
*F16K 27/12*  (2006.01)
(Continued)

(52) U.S. Cl.
CPC ............ *F16K 31/508* (2013.01); *F16K 27/12* (2013.01); *F16K 47/02* (2013.01); *F16K 19/006* (2013.01); *F16K 31/14* (2013.01); *F16K 31/145* (2013.01)

(58) Field of Classification Search
CPC ...... F16K 31/145; F16K 31/14; F16K 31/508; F16K 31/3855; F16K 31/3835;
(Continued)

(56) References Cited

U.S. PATENT DOCUMENTS

| 3,590,860 A | 7/1971 | Stenner |
| 6,276,659 B1 * | 8/2001 | Wang ...................... F16K 21/10 251/230 |

(Continued)

FOREIGN PATENT DOCUMENTS

| EP | 0326058 A2 | 8/1989 |
| EP | 0805310 A1 | 11/1997 |

(Continued)

OTHER PUBLICATIONS

International Search Report dated May 17, 2018 in corresponding application PCT/EP2018/050961.

*Primary Examiner* — Craig J Price
*Assistant Examiner* — Andrew J Rost
(74) *Attorney, Agent, or Firm* — Muncy, Geissler, Olds & Lowe, P.C.

(57) ABSTRACT

A valve for a flush-mounted body of a sanitary fitting, at least having a valve housing with a longitudinal axis, a rotatable flow control element for adjusting a flow volume of a liquid flowing through the valve, and a valve knob for opening and closing the valve. The valve knob can be adjusted via the flow control element, rotationally and parallel to the longitudinal axis, by a control knob for the valve, and the control knob is fastened to the valve knob by a rotary coupling so that the control knob can be non-rotatably fastened relative to the valve housing.

9 Claims, 4 Drawing Sheets

(51) Int. Cl.
*F16K 47/02* (2006.01)
*F16K 31/14* (2006.01)
*F16K 11/00* (2006.01)
*F16K 31/145* (2006.01)

(58) Field of Classification Search
CPC ........ F16K 19/006; F16K 27/12; F16K 47/02; F16K 31/52408; F16K 31/52491; F16K 31/524; F16K 7/17; F16K 31/1221; F16K 31/383; G05D 7/03
See application file for complete search history.

(56) References Cited

U.S. PATENT DOCUMENTS

| | | | |
|---|---|---|---|
| 10,337,641 B2* | 7/2019 | Ye | F16K 47/023 |
| 10,458,567 B2* | 10/2019 | Buchmueller | F16K 31/3855 |
| 2009/0146090 A1* | 6/2009 | Hashimoto | F16K 31/52491 |
| | | | 251/25 |
| 2015/0115183 A1 | 4/2015 | Nobili | |

FOREIGN PATENT DOCUMENTS

| | | |
|---|---|---|
| EP | 2848846 A1 | 3/2015 |
| GB | 2088021 A | 6/1982 |

* cited by examiner

VALVE FOR A FLUSH-MOUNTED BODY OF A SANITARY FITTING, HAVING A CONTROL KNOB ROTATABLY FASTENED TO A VALVE KNOB

This nonprovisional application is a continuation of International Application No. PCT/EP2018/050961, which was filed on Jan. 16, 2018, and which claims priority to German Patent Application No. 10 2017 100 709.1, which was filed in Germany on Jan. 16, 2017, and which are both herein incorporated by reference.

BACKGROUND OF THE INVENTION

Field of the Invention

The present invention relates to a valve for a flush-mounted body of a sanitary fitting. Such flush-mounted bodies can be fastened inside a wall breakthrough, a cavity in a wall or other type of support. In particular, in built-in walls and pre-wall systems such flush-mounted bodies have proven to be successful.

Description of the Background Art

Flush-mounted bodies serve to attach a functional unit in a brick wall, a wall or a support. The functional unit may comprise a thermostat cartridge and a valve. By means of the thermostat cartridge, a cold water and a hot water are miscible to a mixed water with a desired mixed water temperature, wherein the volume of the mixed water to be removed can be controlled by means of the valve. For this purpose, a cold water connection of the flush-mounted body is frequently connectable with a cold water house connection and a hot water connection of the flush-mounted body is frequently connectable with a hot water house connection via appropriate pipes. Furthermore, at least one mixed water line can be connected to the flush-mounted body via which the mixed water of the sanitary fitting, such as a hand-held shower head, overhead shower head, nozzle, spout and/or the like on a shower and/or bathtub, can be fed. The mixed water can be supplied from the thermostat cartridge via corresponding lines in the functional unit to at least one valve, by means of which the flow volume of the liquid through the sanitary fitting is controllable. Known valves for flush-mounted bodies have a control knob for opening and closing the valve, located within a rotatable knob for adjusting a flow volume of the liquid flowing through the valve. A disadvantage of the known valves is that the control knob is rotated when the knob is turned by a user adjusting the flow volume of the liquid. This is particularly disadvantageous in control knobs which are provided, for example, with a label or other identification, which can no longer be read when the control knob is rotated. In order to prevent co-rotation of the control knobs, known flush-mounted bodies require additional components for a rotationally fixed positioning of the control knob to always hold the control knob label in a horizontal orientation. Among other things, the additional components mean that the valve requires a comparatively large amount of space. This in turn limits the design options of the flush-mounted body. Furthermore, there is the problem in the known valves that the control knob can become detached from the valve and fall off.

SUMMARY OF THE INVENTION

It is therefore an object of the present invention to at least partially solve the problems described with reference to the prior art and in particular to specify a valve for a flush-mounted body of a sanitary fitting, whose control knob can be held with little effort in a horizontal orientation and can be secured against unintentional detachment.

In an exemplary embodiment, a valve for a flush-mounted body of a sanitary fitting is provided, which comprises at least the following components: a valve housing having a longitudinal axis; a rotatable flow control element for adjusting a flow volume of a liquid flowing through the valve; and a valve knob for opening and closing the valve, wherein the valve knob is rotatable by means of the flow control element and is adjustable parallel to the longitudinal axis by a control knob for the valve, and wherein the control knob is fastened to the valve knob by means of a rotary coupling, such that the control knob can be non-rotatably fastened relative to the valve housing.

The valve can be used for, for example, a flush-mounted body which is particularly suitable for sanitary fittings used in conjunction with showers and/or bathtubs. The sanitary fittings may in particular be water spouts, hand-held shower heads, overhead shower heads, nozzles and/or the like. The flush-mounted body serves in particular for the attachment of a functional unit. The functional unit in particular comprises a thermostat cartridge. By means of the thermostat cartridge, in particular a cold water and a hot water are miscible to a mixed water with a desired mixed water temperature. In this case, the cold water may have a cold water temperature which is in particular at most 25° C. (Celsius), preferably 1° C. to 25° C., more preferably 5° C. to 20° C. The hot water may have a hot water temperature, which is in particular at most 90° C., preferably 25° C. to 90° C., more preferably 55° C. to 65° C. The functional unit is in particular at least partially disposed in a receiving space of a housing of the flush-mounted body and/or is substantially cylindrical. Such flush-mounted bodies are frequently attached inside a wall breakthrough, a cavity in a wall or other type of support. The valve can also be part of the functional unit. The mixed water mixed by the thermostat cartridge can be supplied to the valve in the functional unit with at least one line, by means of which the volume of the mixed water that is removed can be controlled via the sanitary fitting.

The valve can have a valve housing with a longitudinal axis. By means of the valve housing, the valve can be fastened in particular on or in the functional unit. Furthermore, the valve housing is at least partially tubular.

Furthermore, the valve can have a flow control element which is rotatable about an axis of rotation for adjusting the flow volume of the liquid flowing through the valve. The axis of rotation preferably corresponds to the longitudinal axis of the valve housing. By means of the rotatable flow control element, the volume of the liquid or the mixed water that is removed is adjustable via the sanitary fitting. The flow control element is in particular non-rotatably connected to a rotary knob via which a user can operate the flow control element to adjust the flow volume of the liquid.

In addition, the valve can have a valve knob for opening and closing the valve, wherein the valve knob is rotatable by means of the flow control element and is adjustable parallel to the longitudinal axis by a control knob for the valve. For opening and closing the valve, the valve knob is adjustable between two stable or latched positions, in particular parallel to the longitudinal axis, by means of the control knob. In the first stable position, the valve is at least partially open, and in the other stable position it is completely closed. The control knob is preferably located outside the flush-mounted body and/or is arranged in particular inside the rotary knob.

In order to prevent the control knob from always rotating with the valve knob or the rotary knob, the control knob is fastened by means of a rotary coupling to the valve knob, so that the control knob can be rotationally fixed relative to the valve housing. The rotationally fixed attachment of the control knob can be achieved, for example, via a mechanical connection to the valve housing and/or to another fixed component of the flush-mounted body. As a result, no further additional components are needed that would require additional space within the flush-mounted body. By attaching the control knob on the valve knob via the rotary coupling, the control knob also cannot unintentionally detach.

Moreover, it is advantageous if the rotary coupling is designed as a snap connection. For this purpose, the control knob or a component of the control knob may have, for example, (possibly several) snap arms, lugs, hooks or the like, which can be latched into the valve knob. The snap connection is designed such that the valve knob is rotatable, independent of the control knob.

It is also advantageous if the control knob is secured to the valve knob by a threaded shaft rotationally fixed relative to the valve housing. In this case, "rotationally fixed" can mean, for example, that a rotation of the components to each other is suppressed, i.e. prevented, in the mounted state. The control knob can be screwed onto the threaded shaft in particular to compensate for different installation depths of the flush-mounted body.

Furthermore, it is advantageous if the valve has an externally threaded spindle, which is rotationally fixed relative to the valve housing and is adjustable (only) parallel to the longitudinal axis by means of the control knob for opening and closing the valve. The externally threaded spindle is designed in particular cylindrical in shape and has an external thread at a first longitudinal end. The external thread is in particular not completely formed around the entire circumference of the externally threaded spindle, but preferably has on its peripheral surface at least two threaded portions, which are spaced from each other by thread-free areas. The external thread can be used to adjust the (axial) relative position of the externally threaded spindle to adjacent components or to specify said position during assembly.

Furthermore, it is advantageous if the externally threaded spindle is guided in a groove of a guide. The guide is in particular neither rotatable nor adjustable parallel to the longitudinal axis relative to the valve housing. The externally threaded spindle can be guided in the groove, in particular parallel to the longitudinal axis of the valve housing. The guide has in particular a plate-shaped base which extends in a radial direction of the valve housing. From the plate-shaped base, the groove extends parallel to the longitudinal axis, wherein the groove is formed in particular by two groove fingers. Specifically, the external thread of the externally threaded spindle extends out of the groove in the radial direction.

Furthermore, for adjusting the flow volume of the liquid, it is advantageous if the externally threaded spindle is adjustable parallel to the longitudinal axis by means of an internally threaded spindle that can be rotated by the flow control element. The internally threaded spindle may be at least partially tubular, wherein an internal thread is formed on an inner circumferential surface of the internally threaded spindle. The internal thread of the internally threaded spindle engages in particular in the external thread of the externally threaded spindle, so that the externally threaded spindle is adjustable parallel to the longitudinal axis of the valve housing by rotation of the internally threaded spindle. Furthermore, the internally threaded spindle is non-rotatably connected to the valve knob and/or the flow control element. For this purpose, for example, a toothing may be formed between the internally threaded spindle and the valve knob, wherein the individual teeth of the toothing are aligned in particular parallel to the longitudinal axis. Thus, the externally threaded spindle is rotatable by a rotation of the rotary knob or the flow control element. Furthermore, the internally threaded spindle is adjustable by the valve knob parallel to the longitudinal axis when the control knob is pressed by a user. For this purpose, the internally threaded spindle may have at least one connecting lug, which engages in the valve knob. As a result, the threaded spindle and the valve knob are in particular positively connected to each other.

In addition, it is advantageous if the control knob is held rotationally fixed relative to the valve housing by the externally threaded spindle. For this purpose, the externally threaded spindle is in particular non-rotatably positioned in the groove of the guide and can be guided. To this end, the externally threaded spindle can also have a polygonal, quadrangular or rectangular cross section, in particular in the region of the external thread, the outer contour of which in the thread-free portions can correspond in particular to an inner contour of the groove.

It is also advantageous if the externally threaded spindle engages positively in a threaded shaft of the control knob, so that the threaded shaft is held rotationally fixed relative to the valve housing. For this purpose, in particular a second longitudinal end of the externally threaded spindle extends parallel to the longitudinal axis of the groove of the guide into an opening of the threaded shaft. The second longitudinal end of the externally threaded spindle may likewise have a polygonal, quadrangular or rectangular cross section, the outer contour of which substantially corresponds to an inner contour of the opening of the threaded shaft.

The valve can have a spindle for a regulating body for the liquid or the mixed water, wherein the spindle is adjustable parallel to the longitudinal axis by the externally threaded spindle. The spindle can likewise be arranged at least partially in the groove of the guide and/or contact the externally threaded spindle, so that the spindle can be adjusted parallel to the longitudinal axis during a movement of the externally threaded spindle. At an end of the spindle opposite the externally threaded spindle, the spindle is preferably connected to the regulating body of the valve, by means of which the flow volume of the liquid flowing through the valve can be controlled.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
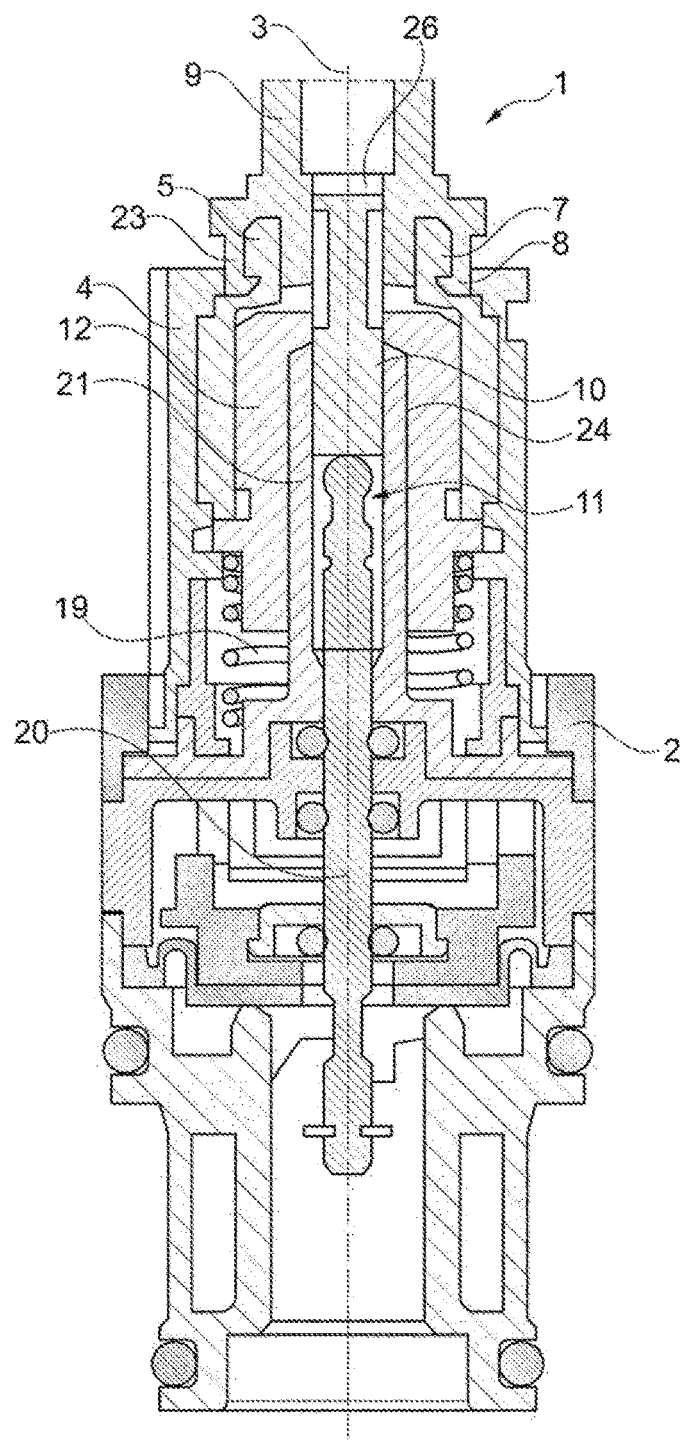
FIG. 1 illustrates the valve in a longitudinal section.
Figure 3:
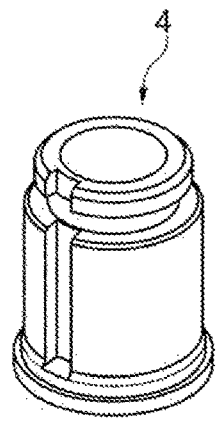
FIG. 3 illustrates a flow control element of the valve in a perspective view.
Figure 4:
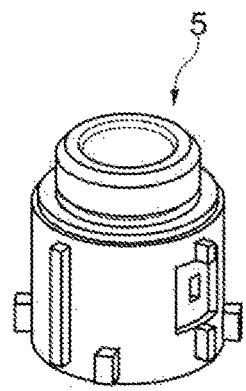
FIG. 4 illustrates a valve knob of the valve in a perspective view.
Figure 5:
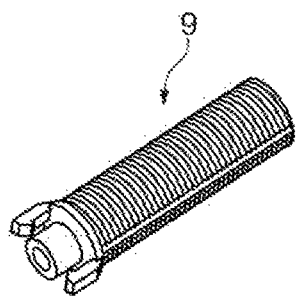
FIG. 5 illustrates a threaded shaft of a control knob in a perspective view.
Figure 7:
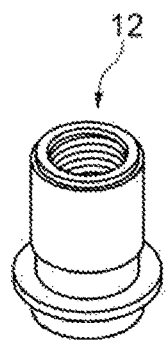
FIG. 7 illustrates an internally threaded spindle of the valve in a perspective view.
Figure 8:
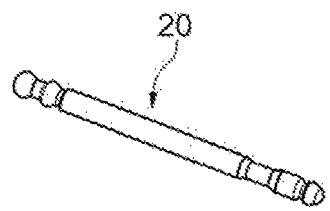
FIG. 8 illustrates a spindle of the valve in a perspective view.

FIG. 1 shows a valve 1 for a flush-mounted body of a sanitary fitting in a longitudinal section. The valve 1 has a valve housing 2 with a longitudinal axis 3. On the valve housing 2, a flow control element 4 for adjusting a flow volume of a liquid flowing through the valve 1 is rotatably supported. Furthermore, the flow control element 4 is rotatable about an axis of rotation which corresponds to the longitudinal axis 3. In FIG. 3, the flow control element 4 is shown in a perspective view. Furthermore, the valve 1 has a valve knob 5 for opening and closing the valve 1, which is shown in FIG. 4 in a perspective view. The valve knob 5 may be biased by a spring 19. The valve knob 5 is arranged in the tubular flow control element 4 and non-rotatably connected to the flow control element 4. In addition, the valve knob 5 is adjustable parallel to the longitudinal axis 3 via a threaded shaft 9 of a control knob 6 shown in FIG. 3. The threaded shaft 9 is connected to the valve knob 5 via a rotary joint 7, which is designed here in the manner of a snap connection 8. For this purpose, the threaded shaft 9 has snap legs 23 which are latched into the valve knob 5. The threaded shaft is shown in FIG. 5 in a perspective view. The valve knob 5 is rotatable about the longitudinal axis 3 by means of the flow control element 4 and a rotary knob 17 shown in FIG. 2, whereas the threaded shaft 9 is held by the rotary joint 7, rotationally fixed relative to the valve housing 2. The valve knob 5 is also tubular or cup-shaped, wherein within the valve knob 5, an internally threaded spindle 12 is arranged, which is shown in FIG. 7 in a perspective view. The internally threaded spindle 12 is rotatable about the longitudinal axis 3 by means of the flow control element 4 and can be adjusted parallel to the longitudinal axis 3 by means of the valve knob 5. The internally threaded spindle 12 has an internal thread 24 which engages in an external thread 25, shown in FIGS. 2 and 6, of an externally threaded spindle 10. The externally threaded spindle 10 is adjustable in a groove 11 of a guide 21, which is shown in a perspective view in FIG. 9, by turning the flow control element 4 or pressing the valve knob 5 via the threaded shaft 9 parallel to the longitudinal axis 3. By adjusting the externally threaded spindle 10, a spindle 20 is movable parallel to the longitudinal axis 3, which is also at least partially disposed in the groove 11 of the guide 21 and is shown in FIG. 8 in a perspective view. At a longitudinal end opposite the externally threaded spindle 10, the spindle 20 is connected to a regulating body. The externally threaded spindle 10 is non-rotatably guided in the groove 11 relative to the guide 21 and the valve housing 2. The externally threaded spindle 10 also protrudes into an opening 26 of the threaded shaft 9, so that the threaded shaft 9 is also held non-rotatably relative to the valve housing 2.

Figure 2:
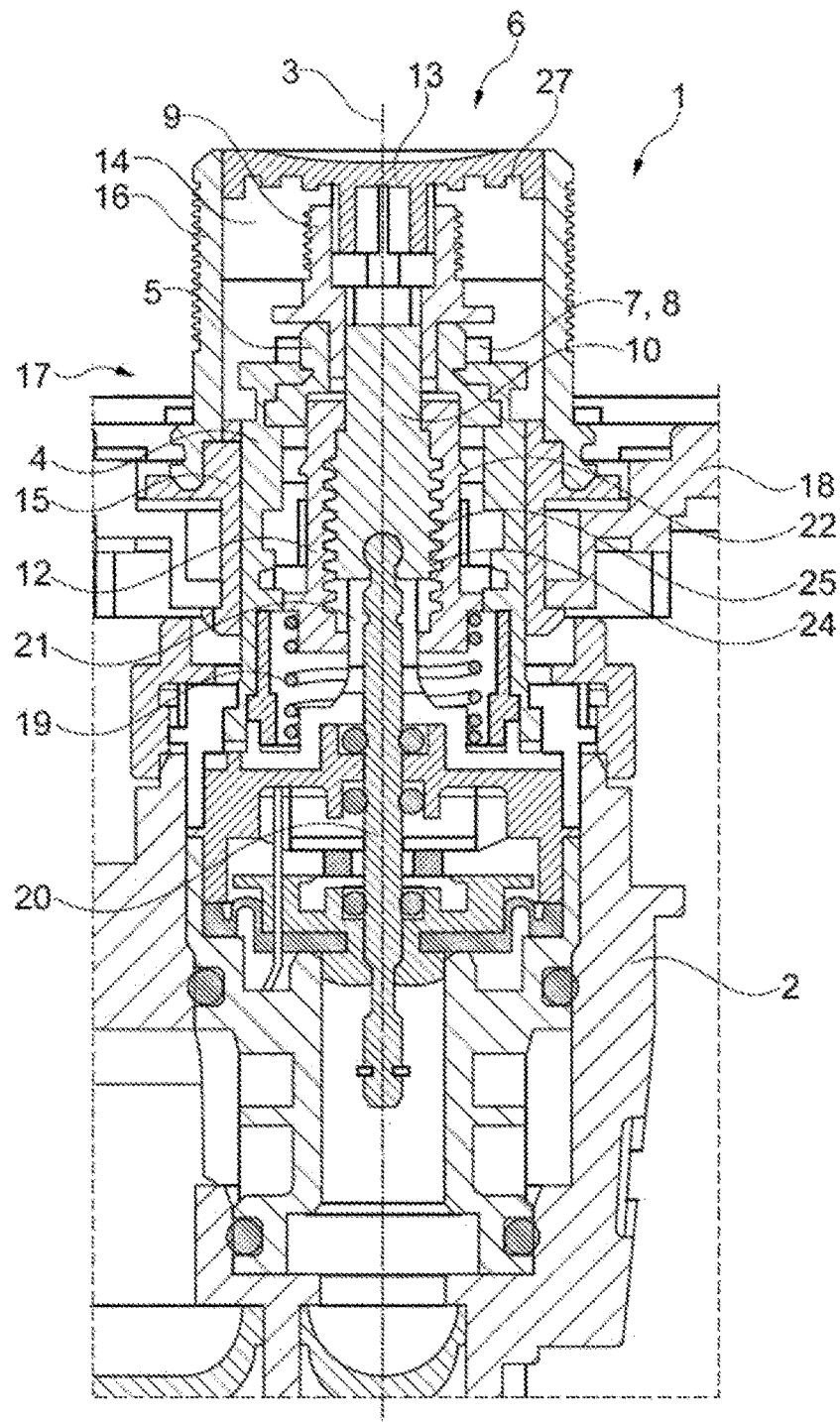
FIG. 2 illustrates the valve rotated by 90° about a longitudinal axis in a longitudinal section.

As compared to FIG. 1, FIG. 2 shows the valve 1 in a position rotated by 90° about the longitudinal axis 3 in a longitudinal section. In addition, in FIG. 2, a control knob 6 and a rotary knob 17 are connected to the valve 1. The control knob 6 comprises an intermediate part 14 screwed on the threaded shaft 9, the position of which can be secured on the threaded shaft 9 by means of a cap 13. For this purpose, the cap 13 and the intermediate part 14 have a spur gear 27. The control knob 6 is located within the rotary knob 17. The rotary knob 17 comprises a rotary knob top 16, which is rotatably mounted on a support plate 18 about the longitudinal axis 3, and a rotary knob base 15, which is non-rotatably fixed to the rotary knob top 16. The rotary knob base 15 is also non-rotatably connected to the flow control element 4. Furthermore, in FIG. 2, a connection lug 22 of the internally threaded spindle 12 can be seen, which engages in the valve knob 5. The internally threaded spindle 12 also engages with its internal thread 24 in the external thread 25 of the externally threaded spindle 10, so that the externally threaded spindle 10 is adjustable parallel to the longitudinal axis 3 by pressing the control knob 6 or by turning the rotary knob 17.

Figure 6:
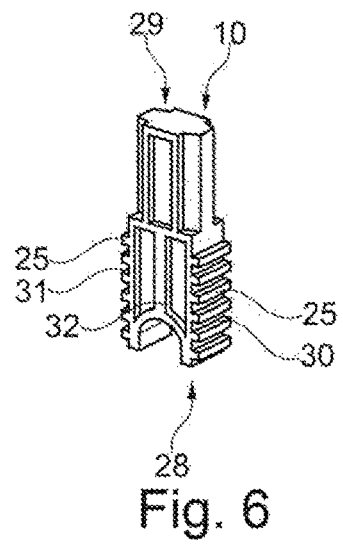
FIG. 6 illustrates an externally threaded spindle of the valve in a perspective view.

FIG. 6 shows the externally threaded spindle 10 in a perspective view. The external thread 25 is formed in a first threaded portion 30 and in a second threaded portion 31 at a first longitudinal end 28 of the externally threaded spindle 10. The first threaded portion 30 and the second threaded portion 31 are interrupted in a circumferential direction by two thread-free portions 32, of which only one thread-free portion 32 is shown here. The thread-free portions 32 come to rest with a first groove finger 33 shown in FIG. 9 and a second groove finger 34 of the guide 21. The externally threaded spindle 10 also has a second longitudinal end 29, which is inserted into the opening 26 of the threaded shaft 9 shown in FIG. 1.

Figure 9:
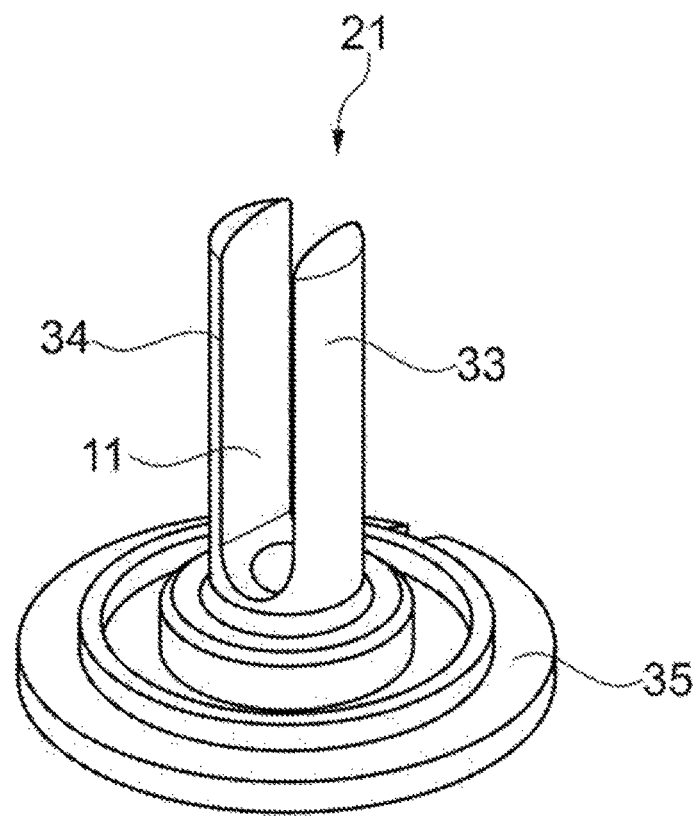
FIG. 9 illustrates a guide for the externally threaded spindle of the valve in a perspective view.

FIG. 9 shows the guide 21, which has a plate-shaped base 35 from which the first groove finger 33 and the second groove finger 34, between which the groove 11 is formed, extend parallel to the longitudinal axis 3 shown in FIGS. 1 and 2.

The proposed valve is characterized by a control knob which is rotationally fixed relative to a valve housing, and which is secured against accidentally being detached from a valve knob of the valve.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A valve for a flush-mounted body of a sanitary fitting, the valve comprising:
   a valve housing with a longitudinal axis;
   a rotatable flow control element for adjusting a flow volume of a liquid flowing through the valve;
   a control knob; and
   a valve knob for opening and closing the valve,
   wherein the valve knob is rotatably adjustable via the flow control element and is adjustable parallel to the longitudinal axis by the control knob,
   wherein the control knob is attached to the valve knob via a rotary joint so that the control knob is rotationally fixed relative to the valve housing, and
   wherein a threaded shaft of the control knob, which is rotationally fixed relative to the valve housing, is attached to the valve knob.

2. The valve according to claim 1, wherein the rotary joint is a snap connection.

3. A valve for a flush-mounted body of a sanitary fitting, the valve comprising:
- a valve housing with a longitudinal axis;
- a rotatable flow control element for adjusting a flow volume of a liquid flowing through the valve;
- a control knob;
- a valve knob for opening and closing the valve; and
- an externally threaded spindle which is rotationally fixed relative to the valve housing and is adjustable parallel to the longitudinal axis via the control knob for opening and closing the valve, wherein the valve knob is rotatably adjustable via the flow control element and is adjustable parallel to the longitudinal axis by the control knob, and wherein the control knob is attached to the valve knob via a rotary joint so that the control knob is rotationally fixed relative to the valve housing.

4. The valve according to claim 3, wherein the externally threaded spindle is guided in a groove of a guide.

5. The valve according to claim 3, wherein the externally threaded spindle is adjustable parallel to the longitudinal axis via an internally threaded spindle, which is adapted to be rotated by the flow control element, to adjust the flow volume of the liquid.

6. The valve according to claim 5, wherein the internally threaded spindle is non-rotatably connected to the valve knob and is adjustable parallel to the longitudinal axis by the valve knob.

7. The valve according to claim 3, wherein the control knob is held by the externally threaded spindle in a rotationally fixed manner relative to the valve housing.

8. The valve according to claim 7, wherein the externally threaded spindle positively engages in a threaded shaft of the control knob, so that the threaded shaft is held rotationally fixed relative to the valve housing.

9. The valve according to claim 3, further comprising a spindle for a regulating body for the liquid, wherein the spindle is adjustable parallel to the longitudinal axis via the externally threaded spindle.

* * * * *